(12) United States Patent
Yamada

(10) Patent No.: US 8,605,259 B2
(45) Date of Patent: Dec. 10, 2013

(54) RANGE FINDER

(71) Applicant: Nikon Vision Co., Ltd., Tokyo (JP)

(72) Inventor: Kenji Yamada, Yachiyo (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 13/729,925

(22) Filed: Dec. 28, 2012

(65) Prior Publication Data

US 2013/0114063 A1    May 9, 2013

Related U.S. Application Data

(62) Division of application No. 12/813,006, filed on Jun. 10, 2010, now Pat. No. 8,477,290.

(30) Foreign Application Priority Data

Jun. 22, 2009 (JP) ................................. 2009-147299
Jan. 18, 2010 (JP) ................................. 2010-007799

(51) Int. Cl.
G01C 3/08 (2006.01)

(52) U.S. Cl.
USPC ......... 356/4.01; 356/3.01; 356/4.1; 356/5.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 6,441,887 B1 | 8/2002 | Kao | |
| 6,573,981 B2 * | 6/2003 | Kumagai et al. | ............. 356/4.08 |
| 6,894,767 B2 | 5/2005 | Ishinabe et al. | |
| 7,193,792 B2 | 3/2007 | Bernhard et al. | |
| 2002/0008865 A1 * | 1/2002 | Shirai et al. | ................... 356/4.04 |
| 2005/0179888 A1 * | 8/2005 | Kallio | ............................ 356/5.1 |
| 2005/0275825 A1 | 12/2005 | Ohtomo et al. | |

FOREIGN PATENT DOCUMENTS

| | | |
|---|---|---|
| EP | 1 607 766 A1 | 12/2005 |
| JP | A-49-032654 | 3/1974 |
| JP | A-61-255302 | 11/1986 |
| JP | A-62-052477 | 3/1987 |

(Continued)

OTHER PUBLICATIONS

Oct. 17, 2011 Office Action issued in Japanese Patent Application No. 2010-007799 (with translation).

(Continued)

*Primary Examiner* — Luke Ratcliffe
(74) *Attorney, Agent, or Firm* — Oliff & Berridge, PLC

(57) ABSTRACT

A laser range finder 100 includes: a light source 10 emitting light from a linear light-emitting portion 10a with making a divergent angle of the light larger in a transversal direction of the light-emitting portion 10a than in a longitudinal direction thereof; an objective lens 30 projecting the light onto a target object and converging reflection light; a partial reflection member 20 disposed between the light source and the objective lens and having a partial reflection surface 21 composed of a transmitting area 21a transmitting light emitted from the light source and receiving areas 21b reflecting reflection light; and a photodetector 40 detecting the reflection light reflected by the receiving areas; wherein the light source and the partial reflection member are disposed with making the longitudinal direction of the light-emitting portion 10a disposed substantially perpendicular to a longitudinal direction of the transmitting area 21a as seen along an optical axis.

4 Claims, 5 Drawing Sheets

(56) References Cited

FOREIGN PATENT DOCUMENTS

| | | |
|---|---|---|
| JP | A-63-244001 | 10/1988 |
| JP | A-08-094739 | 4/1996 |
| JP | A-10-301216 | 11/1998 |
| JP | A-2001-304838 | 10/2001 |
| JP | A-2002-202369 | 7/2002 |
| JP | A-2002-350543 | 12/2002 |
| JP | A-2004-069611 | 3/2004 |
| JP | A-2005-189231 | 7/2005 |
| JP | A-2006-003098 | 1/2006 |
| JP | A-2006-053055 | 2/2006 |
| JP | A-2008-039600 | 2/2008 |
| JP | A-2001-050742 | 2/2011 |

OTHER PUBLICATIONS

Sep. 6, 2012 Office Action issued in U.S. Appl. No. 12/813,006.

Oct. 19, 2012 Office Action issued in Japanese Patent Application No. 2010-247346 (with translation).

Jul. 2, 2013 Office Action issued in Japanese Patent Application No. 2010-247346 (with translation).

* cited by examiner

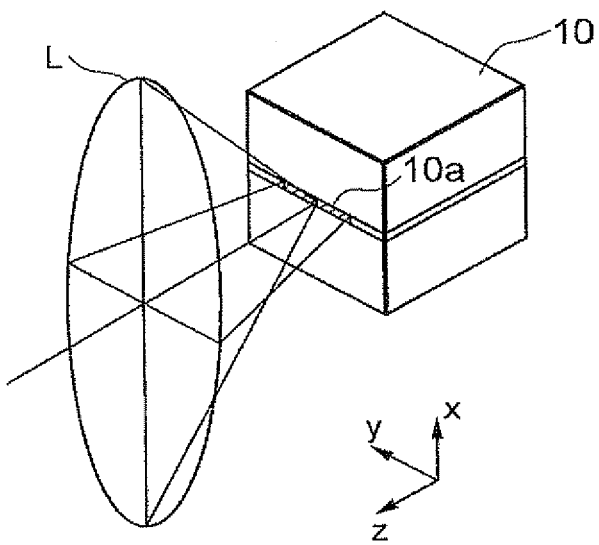
FIG. 2A
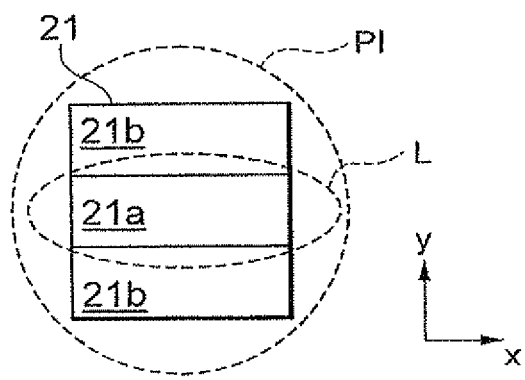
FIG. 2B
FIG. 2C
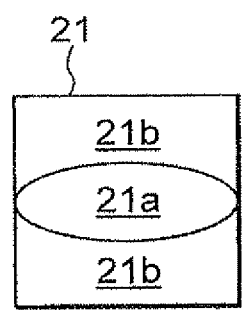
FIG. 2D
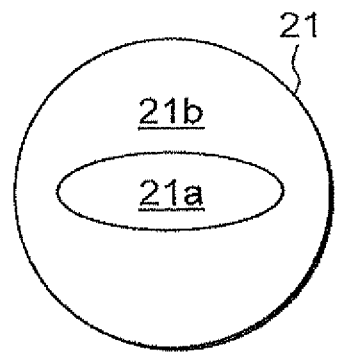

＃ RANGE FINDER

This application is a Divisional application of prior pending U.S. patent application Ser. No. 12/813,006, filed on Jun. 10, 2010, which claims priority to Japanese Patent Application No. 2009-147299 filed on Jun. 22, 2009, and Japanese Patent Application No. 2010-007799 filed on Jan. 18, 2010. The disclosure of the following priority applications are herein incorporated by reference in their entirety.

BACKGROUND OF THE INVENTION

1. Field of the Invention

The present invention relates to a distance measuring apparatus, or range finder.

2. Related Background Art

As a conventional distance measuring apparatus or range finder, there has been proposed a one that disposes a transmitting optical system and a receiving optical system completely independently (for example, see Japanese Patent Application Laid-Open No. 2002-350543).

However, the conventional laser range finder that makes the transmitting optical system and the receiving optical system completely independent has been disadvantageous for making it compact.

Although it has been technically possible to make it compact by making these transmitting optical system and the receiving optical system common, sufficient measurement light amount has not been secured and it has been difficult to make the measuring distance longer.

SUMMARY OF THE INVENTION

The present invention is made in view of the above-described problem, and has an object to provide a distance measuring apparatus or range finder capable of accomplishing both of compactness and a longer measuring distance with respect to a conventional one.

According to a first aspect of the present invention, there is provided a distance measuring apparatus comprising: a light source that emits light from a light-emitting portion having a linear shape with making a divergent angle of the light larger in a transversal direction of the light-emitting portion than in a longitudinal direction of the light-emitting portion; an objective lens that projects the light onto a target object and converges reflection light reflected from the target object; a partial reflection member that is disposed between the light source and the objective lens and has a partial reflection surface composed of a transmitting area transmitting light emitted from the light source and a receiving area reflecting reflection light reflected from the target object and converged by the objective lens; and a photodetector that detects the reflection light reflected by the receiving area of the partial reflection surface; wherein the light source and the partial reflection member are disposed with making the longitudinal direction of the light-emitting portion disposed substantially perpendicular to a longitudinal direction of the transmitting area as seen along an optical axis.

According to the second aspect of the present invention, there is provided a distance measuring apparatus comprising: a light source that emits light from a light-emitting portion having a linear shape with making a divergent angle of the light larger in a transversal direction of the light-emitting portion than in a longitudinal direction of the light-emitting portion; an objective lens that projects the light onto a target object and converges reflection light reflected from the target object; a partial reflection member that is disposed between the light source and the objective lens and has a partial reflection surface composed of a transmitting area reflecting light emitted from the light source and a receiving area transmitting reflection light reflected from the target object and converged by the objective lens; and a photodetector that detects the reflection light transmitted by the receiving area of the partial reflection surface; wherein the light source and the partial reflection member are disposed with making the longitudinal direction of the light-emitting portion disposed substantially perpendicular to a longitudinal direction of the transmitting area as seen along an optical axis.

In a first or second aspect of the present invention, the distance measuring apparatus includes, a wavelength separation member having a wavelength separation surface that is disposed between the objective lens and the partial reflection member, transmits the light, and reflects visible light; and an eyepiece that is for observing a primary image of the target object formed by means of the objective lens with the visible light reflected by the wavelength separation surface.

In a first or second aspect of the present invention, it is preferable that at least a portion of the objective lens is moved in a direction having a component perpendicular to the optical axis.

In a first or second aspect of the present invention, it is preferable that at least a portion of the objective lens is moved along the optical axis upon focusing.

With configuring the distance measuring apparatus or range finder as described above, it becomes possible to accomplish both of compactness and a longer measuring distance.

BRIEF DESCRIPTION OF THE DRAWINGS

FIGS. 2A, 2B, 2C and 2D are diagrams showing a relation between laser light emitted from a light source and a partial reflection surface, in which FIG. 2A shows diversion of the light flux emitted from the light source, FIG. 2B shows a relation between a pupil of an objective lens and the light flux emitted from the light source on the partial reflection surface, and FIGS. 2C and 2D show variations of the partial reflection surface.

DESCRIPTION OF THE MOST PREFERRED EMBODIMENT

[First Embodiment]

Figure 1:
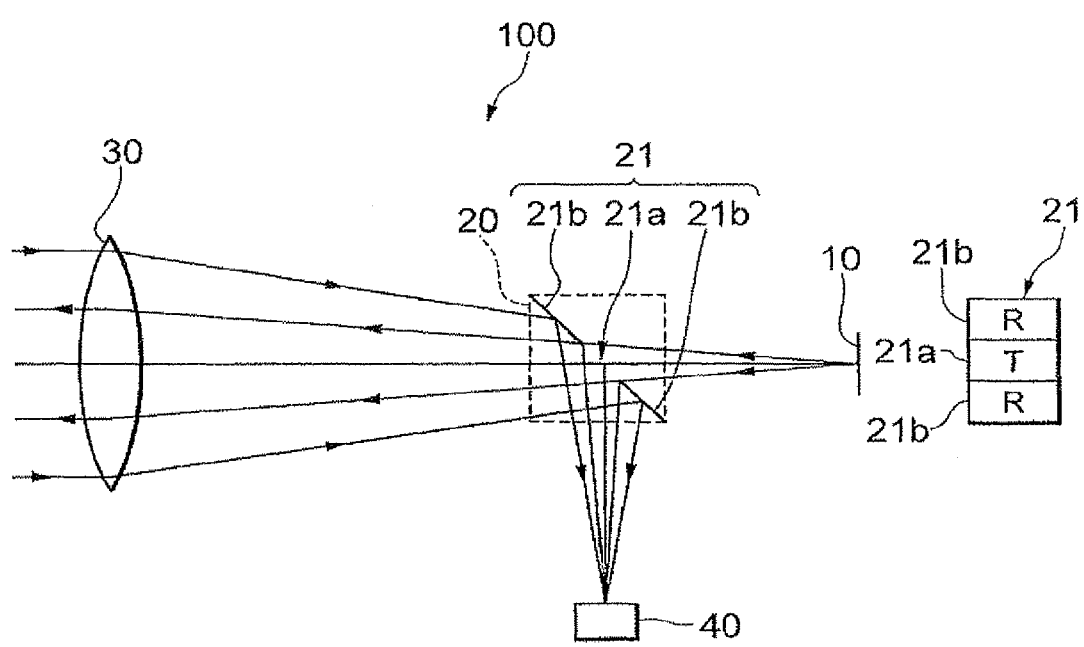
FIG. 1 is a diagram showing a configuration of a laser range finder according to a first embodiment.

Preferred embodiments according to the present invention are explained below with reference to accompanying drawings. A configuration of a laser range finder 100 as a distance measuring apparatus according to the first embodiment is explained with reference to FIG. 1. The laser range finder 100 is composed of a light source 10 that is a semiconductor laser, a partial reflection member 20, an objective lens 30, and a photodetector 40. The light source 10 is disposed on the focal point of the objective lens 30 or in the vicinity thereof. The partial reflection member 20 has a partial reflection surface 21 inclined with respect to an optical axis and is disposed between the light source 10 and the objective lens 30. The partial reflection surface 21 is divided into three areas, and composed of a transmitting area 21a disposed with including the optical axis and having a substantially rectangular shape, and two receiving areas 21b disposed above and below of the transmitting area, each having a substantially rectangular shape. In the first embodiment, the transmitting area 21a is constructed as a light transmission surface (T) that transmits light emitted from the light source 10, and the receiving areas 21b are constructed as light reflection surfaces (R) that reflect reflection light incident from the objective lens 30 side. The photodetector 40 is disposed at a position (on the focal point of the objective lens 30 or in the vicinity thereof) where light reflected by the receiving areas 21b converges.

In the laser range finder 100 having such a construction, laser light emitted in pulses from the light source 10 (hereinafter called as measurement light, too) transmits through the transmitting area 21a formed at substantially the center of the partial reflection surface 21, incident on the objective lens 30, transformed into substantially parallel light by the objective lens 30, and projected on an unillustrated target object. A portion of measurement light reflected and dispersed by the target object (hereinafter called as reflection light, too) is incident on the objective lens 30 to be converged, reflected by the receiving areas 21b formed on the partial reflection surface 21, and converged on the photodetector 40. Accordingly, electrical signals output from the photodetector 40 in response to detected reflection light are processed by an unillustrated distance calculation portion. With measuring time from emitting measurement light to receiving reflection light and by using the time and velocity of light, the distance between the laser range finder 100 and the target object can be calculated. In this manner, when transmitting measurement light and receiving reflection light are carried out by the common partial reflection member 20 and the objective lens 30, the laser range finder 100 can be made compact.

A light-emitting portion 10a of the light source 10 emitting such measurement light (laser light) is very small, but is not a point in a precise sense, and forms a linear area having a length and a width. The length ranges from several times to several dozen times of the width, and it depends on the kind of semiconductor laser. The length may become several hundred times of the width in a case of a high output one in particular. As described above, since the light-emitting portion 10a is not a point, but near to a line, a sectional shape (far field image) of the bundle of rays L of the laser light emitted from the light-emitting portion 10a becomes an elliptical shape whose minor axis is the length direction of the light-emitting portion 10a and major axis is the width direction thereof. When it is assumed that the normal direction of the light-emitting portion 10a (a direction that laser light is emitted, and a direction of the optical axis of the laser range finder 100) is z-axis, the width direction is x-axis, and the length direction is y-axis, laser light (measurement light) emitted from the light source 10 passes through an elliptical area extending wide in x-axis direction from the center (optical axis) to the periphery and narrow in y-axis direction near the center (optical axis) within the pupil PI of the objective lens 30 as shown in FIG. 2B.

In order to make the measurement distance of the laser range finder 100 long, using efficiency of the laser light emitted from the light source 10 is necessary to be high. Accordingly, in the laser range finder 100 according to the first embodiment, the transmitting area 21a and the receiving areas 21b of the partial reflection surface 21 are formed in a substantially rectangular shapes and disposed and arranged in y-axis direction such that as seen along the optical axis (z-axis), a longitudinal direction of the transmitting area 21a composing the partial reflection surface 21 with respect to the light source 10 is made substantially perpendicular to the longitudinal direction of the light-emitting portion 10a of the light source 10 (the major axis direction of the bundle of rays L having an elliptical shape is substantially coincident with the longitudinal direction of the transmitting area 21a having a substantially rectangular shape) as shown in FIG. 23. With disposing the light source 10 (the light-emitting portion 10a) and the partial reflection surface 21 (the transmitting area 21a and the receiving areas 21b) this way, emitted light amount can be most effectively secured with respect to the light emitting area of the laser light having elliptical section, so that measurement distance can be expanded. Laser light (reflection light) reflected from the target object and incident on the objective lens 30 can be received by the receiving areas 21b disposed at the areas where measurement light from the light source 10 does not pass (peripheral area in y-axis direction disposed in line symmetry with respect to x-axis), and led to the photodetector 40, so that sufficient areas can be secured with respect to the reflection light.

[Second Embodiment]

Figure 3:
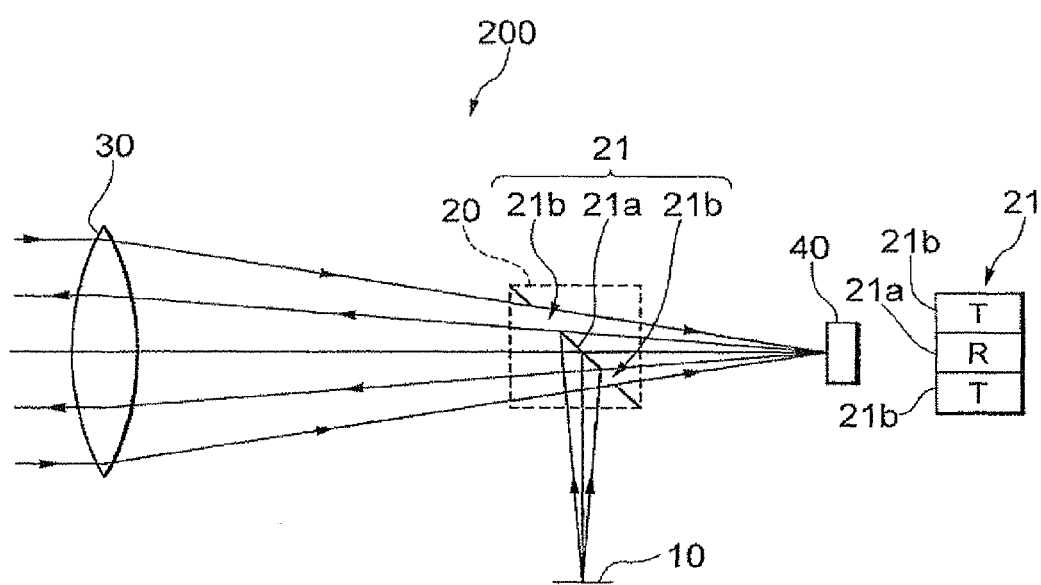
FIG. 3 is a diagram showing a configuration of a laser range finder according to a second embodiment.

As seen in a laser range finder 200 as a distance measuring apparatus according to a second embodiment shown in FIG. 3, a partial reflection surface 21 formed on a partial reflection member 20 may be constructed by making a transmitting area 21a as a light reflection surface (R), and two receiving areas 21b as light transmission surfaces (T). In this case, measurement light emitted from a light source 10 is reflected by the transmitting area 21a formed at the center of the partial reflection surface 21, incident on an objective lens 30, transformed into substantially parallel light by the objective lens 30, and projected to an unillustrated target object. A portion of reflection light reflected and dispersed by the target object is incident on the objective lens 30, and converged by the objective lens 30 to form an image on a photodetector 40 through receiving areas 21b formed on the partial reflection surface 21. In such construction also, arrangement of the light source 10 (the light-emitting portion 10a) and the partial reflection surface 21 (the transmitting area 21a and receiving areas 21b) is the same as described above.

In the laser range finders 100 and 200 according to the first and the second embodiments, respectively, although it is described that each of the transmitting area 21a and receiving areas 21b of the partial reflection surface 21 is formed in a substantially rectangular shape, the shape is not limited to this. For example, as shown in FIG. 2C, with respect to the partial reflection surface 21 having a substantially rectangular shape, the transmitting area 21a may be made to be an elliptical shape and the other portions may be made to be receiving areas 21b or as shown in FIG. 2D, the transmitting area 21a having an elliptical shape may be formed at substantially the center of the partial reflection surface 21 having a circular shape, and the other portions may be made to be receiving areas 21b. As described above, in each case, the major axis (longitudinal direction) of the transmitting area 21a is disposed at substantially right angles to the longitudinal direction of the light-emitting portion 10a.

[Third Embodiment]

Figure 4:
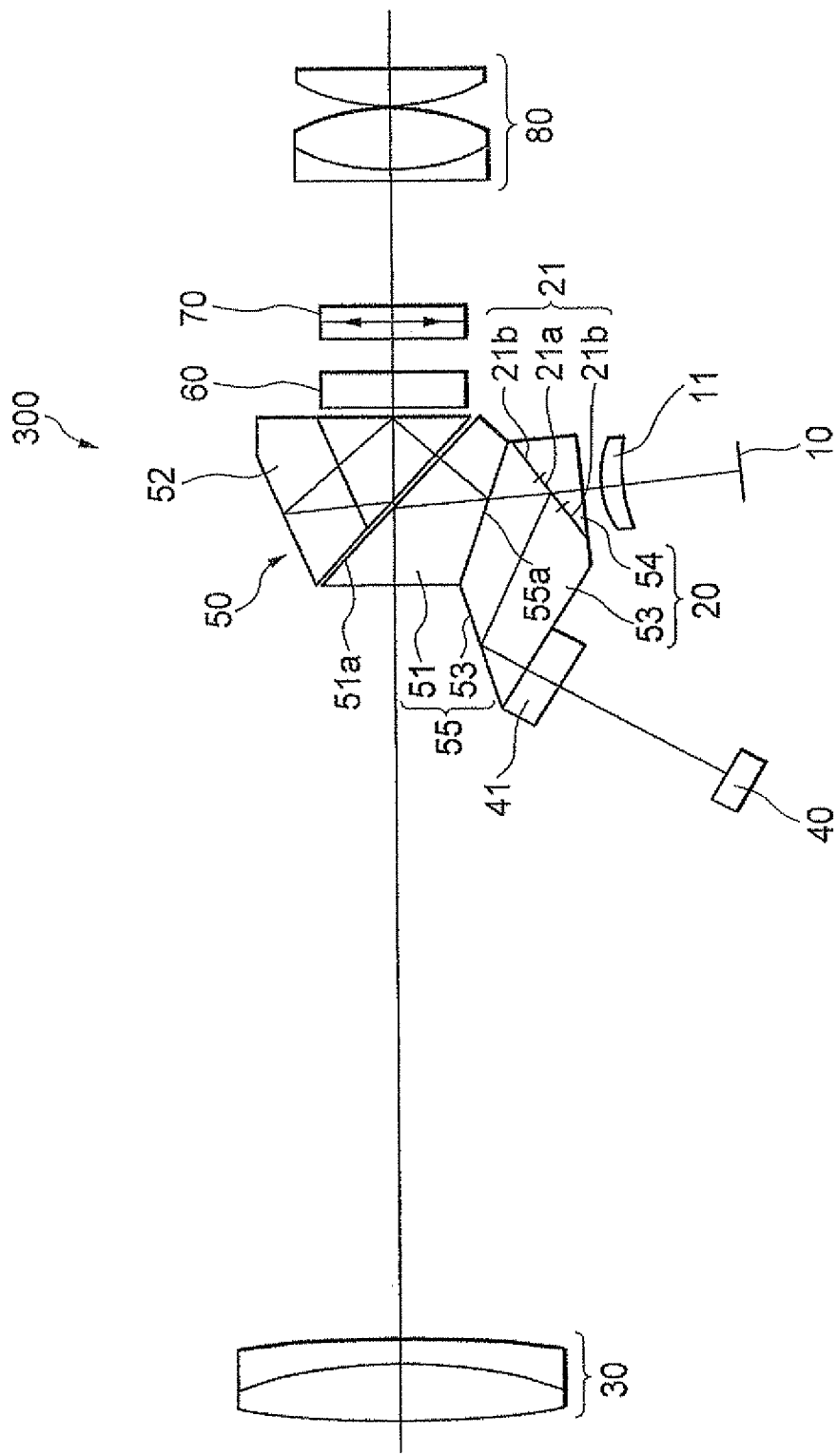
FIG. 4 is a diagram showing a configuration of a laser range finder according to a third embodiment.

Then, a laser rang finder 300 as a distance measuring apparatus according to a third embodiment, which has the laser range finder 100 according to the first embodiment as a fundamental construction, is explained with reference to FIG. 4. The laser range finder 300 includes, in order from an object side, an objective lens 30, a prism member 50, a protection filter 60, a liquid crystal display 70, and an eyepiece 80. On optical paths separated by the prism member 50, a partial reflection surface 21, a condenser lens 11, a light source 10, a background-light-blocking filter 41, and a photodetector 40 are disposed. The prism member 50 is composed of a first prism 51 and a second prism 52 composing an erecting prism that converts an inverted image of the object (target object) formed by the objective lens 30 into an erect image, a third prism 53 that is cemented with the first prism 51 and forms a wavelength-separation surface 55a on the cemented surface therebetween that separates light by reflecting visible light for observing the object and transmitting measurement light (laser light), and a fourth prism 54 that is cemented with the third prism 53 and forms the above-described partial reflection surface 21 on the cemented surface therebetween. In this manner, a dichroic prism 55, which is a wavelength separation member, is composed of the first prism 51 and the third prism 53. The third prism 53 and the fourth prism 54 compose the above-described partial reflection member 20, and, for example, a reflection layer made of aluminum is deposited on each receiving area 21b, which is a light reflection surface.

In the laser range finder 300 having such construction, light (visible light) emitted from the object (target object) is converged by the objective lens 30, incident on the first prism 51, reflected by a reflection surface 51a and the wavelength-separation surface 55a of the first prism 51, and incident on the second prism 52. Then, the light is reflected three times in the second prism 52, passes through the protection filter 60, and forms an image as a primary image (erected image) of the object. The liquid crystal display 70 is disposed at substantially the same position as the position the primary image is formed, so that a measurer can observe enlarged primary image of the object together with an image displayed on the liquid crystal display 70 in a superimposing manner through an eyepiece 80. In other words, the measurer can collimate the target object by means of a telescopic optical system composed of the objective lens 30, the erecting prism (the first and second prisms) 51 and 52, the protection filter 60, the liquid crystal display 70 and the eyepiece 80.

On the other hand, measurement light (laser light) emitted from the light source 10 is converged by the condenser lens 11, incident on the fourth prism 54, passes through the transmitting area 21a of the partial reflection surface 21, incident on the third prism 53, and incident on the wavelength-separation surface 55a. As described above, since the wavelength-separation surface 55a transmits the laser light, the measurement light transmits the wavelength-separation surface 55a, is incident on the first prism 51, reflected by a first reflection surface 51a, exits the first prism 51, made to be substantially parallel light by the objective lens 30, and projected onto the target object. A portion of the measurement light (reflection light) reflected and dispersed by the target object is incident on the objective lens 30 to be converged, incident on the first prism 51, reflected by the first reflection surface 51a, passed through the wavelength-separation surface 55a, and incident on the third prism 53. After being reflected by the receiving areas 21b of the partial reflection member 20, the reflection light is reflected once by the third prism 53, passes through the background-light-blocking filter 41, and forms an image on the photodetector 40. Since light other than measurement light is included in such reflection light (measurement light reflected by the target object), the reflection light becomes noise upon detected by the photodetector 40, and S/N ratio is decreased by the noise. Accordingly, S/N ratio is increased by blocking light other than measurement light by using the background-light-blocking filter 41. Moreover, although reflection light (laser light) is separated from visible light by the wavelength-separation surface 55a as described above, in order to prevent remained laser light not separated by the wavelength-separation surface 55a from reaching the measurer's eye, the laser light is removed by the protection filter 60.

With constructing the laser range finder 300 as described above, since the measurer can project measurement light to the target object with collimating the target object through the eyepiece lens 80, the distance to the target object can be measured with correctly capturing the target object. Moreover, with displaying measured distance as an image on the liquid crystal display 70, the distance is displayed in the observation field of the measurer, so that the measurer can confirm the target object together with the distance thereto.

[Fourth Embodiment]

In the hand-held laser range finder 300 according to the third embodiment, since the image of the target object to be collimated blurs by a movement of the hands, there has been a problem that the measurement position is difficult to be set. Then, a laser range finder 400 as a distance measuring apparatus according to a fourth embodiment capable of suppressing image blur by means of moving at least a portion of the objective lens as a vibration reduction lens in a direction having a component perpendicular to the optical axis is explained. Incidentally, the same component as the laser range finder 300 according to the third embodiment is attached to the same reference symbol to eliminate detailed explanations.

Figure 5:
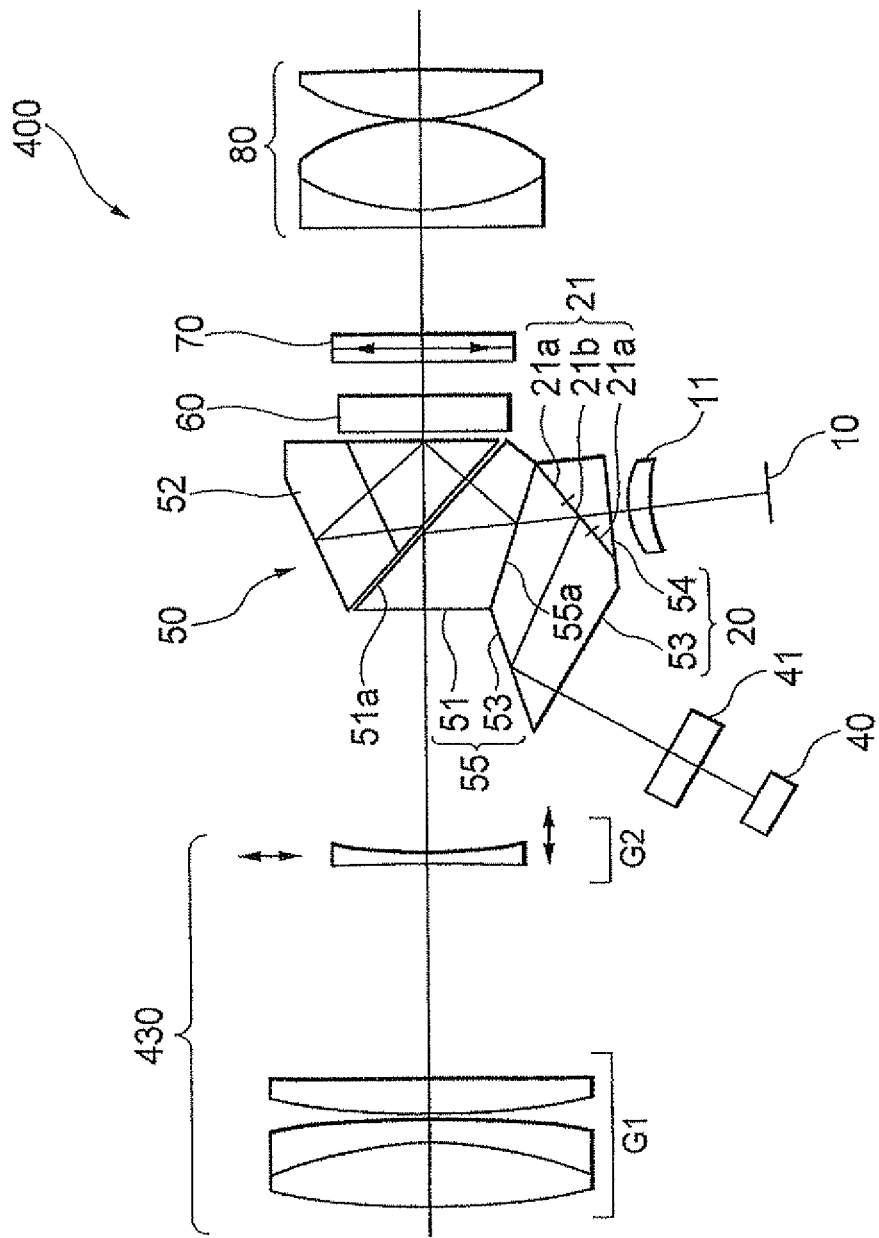
FIG. 5 is a diagram showing a configuration of a laser range finder according to a fourth embodiment.

The laser range finder 400 shown in FIG. 5 is a one, in which the objective lens 30 of the laser range finder 300 according to the third embodiment is replaced by an optical system suitable for carrying out vibration reduction (objective lens 430). In other words, the objective lens 430 is composed of, in order from an object side, a first lens group G1 having positive refractive power, and a second lens group G2 having negative refractive power, and vibration reduction is carried out by moving the second lens group G2 in a direction having a component perpendicular to the optical axis. With putting the first lens group G1 disposed to the object side in possession of positive refractive power, the first lens group G1 can narrow the bundle of rays, so that the diameter of the second lens group G2 can be made small. Accordingly, the second lens group G2 becomes easy to be moved for vibration reduction. In this instance, with providing a gyro-sensor (angular velocity sensor) for detecting a movement of hands, the vibration reduction lens is moved in a direction canceling the detected movement.

Moreover, in the laser range finder 400 having such a construction, upon measuring a distance to a short-range object, with moving at least a portion of the objective lens 430 as a focusing lens along the optical axis, the short-range object is focused, so that the image of the object can be observed clearly. In the laser range finder 400 shown in FIG. 5, the second lens group G2 is made to be the focusing lens.

The whole of the objective lens 430 may be used as the vibration reduction lens and the focusing lens, or the objective lens 430 may be composed of three lens groups or more, and a portion thereof may be used as the vibration reduction lens or the focusing lens. In this case, vibration reduction and focusing may be carried out by different lens groups.

Moreover, in the laser range finder 300 according to the third embodiment, although the background-light-blocking filter 41 is cemented with the third prism 53, the background-light-blocking filter 41 may be disposed with separating from the third prism 53 such as in the laser range finder 400 according to the fourth embodiment.

What is claimed is:

1. A distance measuring apparatus comprising:

a light source that emits light from a light-emitting portion by making a divergent angle of the light larger in a transversal direction of the light-emitting portion than in a longitudinal direction of the light-emitting portion, the light-emitting portion having a linear shape;

an objective lens that projects the light onto a target object and converges reflection light reflected from the target object;

a partial reflection member that is disposed between the light source and the objective lens and has a partial reflection surface composed of a transmitting area reflecting light emitted from the light source and a receiving area transmitting reflection light reflected from the target object and converged by the objective lens; and a photodetector that detects the reflection light transmitted by the receiving area of the partial reflection surface;

wherein the light source and the partial reflection member are disposed with respect to each other such that the longitudinal direction of the light-emitting portion is disposed substantially perpendicular to a longitudinal direction of the transmitting area as seen along an optical axis.

2. The distance measuring apparatus according to claim 1, further comprising:

a wavelength separation member having a wavelength separation surface that is disposed between the objective lens and the partial reflection member, transmits the light, and reflects visible light; and an eyepiece that is for observing a primary image of the target object formed by means of the objective lens with the visible light reflected by the wavelength separation surface.

3. The distance measuring apparatus according to claim 1, wherein at least a portion of the objective lens is moved in a direction having a component perpendicular to the optical axis.

4. The distance measuring apparatus according to claim 1, wherein at least a portion of the objective lens is moved along the optical axis upon focusing.

* * * * *